(12) United States Patent
Asaumi et al.

(10) Patent No.: US 7,602,140 B2
(45) Date of Patent: Oct. 13, 2009

(54) APPARATUS FOR SUPPLYING POWER FOR A VEHICLE

(75) Inventors: Hisao Asaumi, Wako (JP); Hiroaki Horii, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 172 days.

(21) Appl. No.: 10/979,657

(22) Filed: Oct. 14, 2004

(65) Prior Publication Data

US 2005/0099160 A1    May 12, 2005

(30) Foreign Application Priority Data

Nov. 11, 2003    (JP)    ............................. 2003-381221

(51) Int. Cl.
*H02J 7/00* (2006.01)
(52) U.S. Cl. ...................... 320/104; 320/103
(58) Field of Classification Search ......... 320/103–104; 307/10.7
See application file for complete search history.

(56) References Cited

U.S. PATENT DOCUMENTS

| 5,804,948 | A | 9/1998 | Foust | |
| 6,639,384 | B2 * | 10/2003 | Hasegawa et al. | ............ 320/126 |
| 2002/0008495 | A1 * | 1/2002 | Dougherty et al. | ........... 320/104 |
| 2004/0032264 | A1 * | 2/2004 | Schoch | ....................... 324/426 |
| 2005/0035741 | A1 * | 2/2005 | Elder et al. | .................. 320/116 |

FOREIGN PATENT DOCUMENTS

| FR | 2 832 866 A1 | 5/2003 |
| GB | 2 255 243 A | 10/1992 |
| JP | 08 126227 | 5/1996 |
| JP | 2001-171543 | 6/2001 |
| JP | 2003-226207 | 8/2003 |
| WO | 99/42331 A1 | 8/1999 |

OTHER PUBLICATIONS

"European Search Report" European Patent Office. Dated May 21, 2007.

* cited by examiner

*Primary Examiner*—Patrick J Assouad
*Assistant Examiner*—Richard V Muralidar
(74) *Attorney, Agent, or Firm*—Hamre, Schumann, Mueller & Larson, P.C.

(57) ABSTRACT

An apparatus for supplying power for a vehicle includes a first battery, a second battery, a switching device, a monitoring device and a control device. The first battery is electrically connected to load devices which are mounted on the vehicle. The second battery serves as a backup power source. The switching device switches the first and second batteries. The monitoring device monitors remaining capacity for each of the first and second batteries. When the control device determines that the remaining capacity of the second battery is less than the remaining capacity of the first battery based on information monitored by the monitoring device, the control device controls the switching device so as to conduct switching of the first and second batteries.

9 Claims, 4 Drawing Sheets

APPARATUS FOR SUPPLYING POWER FOR A VEHICLE

BACKGROUND OF THE INVENTION

The present invention relates to an apparatus for supplying power for a vehicle, which is able to implement redundancy, and more particularly relates to an apparatus for supplying power for a vehicle which is applied to by-wire systems, such as a steer-by-wire system, a brake-by-wire system and the like.

As for a power supply system for a vehicle which implements redundancy, Japanese Published Patent Application 2003-226207 discloses related arts. In this document, plural batteries are electrically connected in parallel to the load devices of a vehicle so as to establish redundancy. When the remaining capacity of a main battery falls below a predetermined threshold, switching from the main battery to a sub battery is executed.

As for a technique to improve the reliability of a by-wire system, Japanese Published Patent Application 2001-171543 discloses related arts. This document discloses a steer-by-wire system which has a mechanical failsafe device. In the event that such a trouble as loosening of a power terminal or deterioration of a battery makes it impossible to supply power to the system, a steering mechanism is made ready by a clutch provided between a wheel shaft and a rack shaft. In this way, even if the steer-by-wire system does not work, it is possible to avoid a catastrophic trouble such as losing of steering.

Although the technique disclosed in Japanese Published Patent Application 2003-226207 which makes provision for automatic switching from the main battery to the sub-battery in the event of deterioration of the main battery, there is no guaranteeing that the sub-battery can always be kept in sound conditions. For example, when the remaining capacity of the main battery falls due to self discharge, the load devices are automatically connected to the sub-battery by switching. Therefore, it is not always possible to guarantee that the sub-battery always supplies stable power to the load devices after switching.

Because a highly reliable power supply is required for a system such as a steer-by-wire (SBW) system or a brake-by-wire (BBW) system, it is mandatory that stable supply of power to the system should be always implemented both before and after switching from the main battery to the sub-battery, which serves as a backup. In this regard, the apparatus disclosed in Japanese Published Patent Application 2003-226207 is not satisfactory.

The technique disclosed in Japanese Published Patent Application 2001-171543 introduces a wheel shaft aiming at failsafe mechanism in order to mitigate a concern over the reliability of a power supply during supply of power to the steer-by-wire system. However, the technique adversely requires a complicated arrangement, leaving an intrinsic problem associated with the reliability of power supply unsolved.

Similarly, a brake-by-wire system driven by a motor has been developed, which serves as an alternative for hydraulic control with pipes of working-fluid. This system does not solve the same problem associated with the reliability of power supply, either.

SUMMARY OF THE INVENTION

The present invention seeks to provide an apparatus for supplying power for a vehicle, which has a plurality of batteries for redundancy, being arranged so that reliability of a backup battery is controlled to be higher than that of a main battery.

According to an aspect of the present invention, an apparatus for supplying power for a vehicle comprises a first battery, a second battery, a switching device, a monitoring device and a control device. The first battery is electrically connected to load devices which are mounted on the vehicle. The second battery serves as a backup power source. The switching device switches the first and second batteries. The monitoring device monitors remaining capacity for each of the first and second batteries. When the control device determines that the remaining capacity of the second battery is less than the remaining capacity of the first battery based on information monitored by the monitoring device, the control device controls the switching device so as to conduct switching of the first and second batteries.

The apparatus described above, which switches the first and second batteries so that a battery having greater remaining capacity is always assigned to a backup power source, is able to maintain the backup power source in sound conditions. In this way, the apparatus is able to perform stable supply of power, thereby increasing the reliability of the vehicle as a whole.

According to another aspect of the present invention, an apparatus for supplying power for a vehicle further comprises a power generator and a charge controller. The power generator mounted on the vehicle charges the first and second batteries. The charge controller controls charging of the first and second batteries such that the second battery is charged more than the first battery.

The apparatus described above is able to maintain the remaining capacity of a backup power source in preference to a current power source, thereby restraining the deterioration of the backup power source.

According to still another aspect of the present invention, when a vehicle is in operation, the charge controller of an apparatus for supplying power for a vehicle controls such that one of a power generator and a first battery continuously supplies a predetermined amount of power to a second battery serving as a backup power source.

The apparatus described above is able to prevent the remaining capacity of backup power source from falling due to self discharge, thereby always maintaining a higher remaining capacity of backup power source.

According to yet another aspect of the present invention, the charge controller of an apparatus for supplying power for a vehicle has charge protection against charging of a first battery conducted by a second battery.

The apparatus described above is able to prevent useless discharge of the second battery, thereby maintaining its remaining capacity in sound conditions.

According to a further aspect of the present invention, an apparatus for supplying power for a vehicle further comprises an emergency switching device. The emergency switching device executes switching from a first battery to a second battery when the remaining capacity of the second battery is greater than the remaining capacity of the first battery.

Suppose an emergency when the remaining capacity of the first battery is short due to its deterioration, for example. The apparatus is able to start an engine of the vehicle with the second battery serving as a backup power source in a similar fashion as a reserve tank serving as a backup fuel supply in a motor cycle, thereby enabling traveling of the vehicle. Because the second battery is maintained in sound conditions, it is possible to supply stable power so as to reliably drive the vehicle.

According to a still further aspect of the present invention, the load devices of an apparatus for supplying power for a vehicle comprise a by-wire system for controlling electromechanical components of the vehicle by electric signals.

Because a second battery serving as a backup power supply is maintained higher in remaining capacity than a first battery, it is possible to reliably supply power to the by-wire system with the second battery. In other words, it is possible to prevent malfunction of the by-wire system caused by a shortage of power supplied by the second battery. Therefore, the apparatus described above is able to increase the reliability of the by-wire system.

DESCRIPTION OF THE PREFERRED EMBODIMENTS a. Summary of an Apparatus for Supplying Power for a Vehicle According to the Present Invention An apparatus for supplying power for a vehicle according to the present invention has a plurality of batteries, such as a main battery and a sub-battery. The apparatus manages the batteries such that the sub-battery serving as a backup power source keeps higher remaining capacity than that of the main battery.

In description hereinafter, a battery which supplies power to an igniter at an engine start, load devices of a vehicle and a steering device is referred to as a main battery, and a battery used as a backup in an emergency as a sub-battery. In this regard, the main battery and sub-battery are not permanent but interchangeable by a relay circuit.

The apparatus for supplying power for a vehicle according to the present invention has the sub-battery for redundancy serving as a backup for the main battery, which is mounted to a conventional power supply system for a vehicle. An output terminal of the main battery and that of the sub-battery are switched by a relay circuit, so that these two batteries are switched for each load device.

For example, if the apparatus according to the present invention is applied to an apparatus for supplying power for a by-wire system, the sub-battery will supply power to an actuator such as a backup motor (backup steering device) driving a steer-by-wire (SBW) system or an actuator for a brake-by-wire (BBW) system.

The apparatus, which is able to test or check remaining capacity of each battery, monitors regularly the remaining capacity of the main battery and sub-battery. When the apparatus detects that the remaining capacity is not more than a predetermined value, it counts the number of times for the occurrence. If the apparatus discovers that the number is not less than a predetermined value, it determines that a battery has deteriorated, alerting a driver to the deterioration of battery. Furthermore, when the apparatus conducts alerting, it establishes a configuration that the deteriorated battery serves as a main battery and the other battery being in sound conditions as a sub-battery.

In this way, the apparatus is able to supply the backup motor (backup steering device) with power from the sub-battery whose reliability is maintained higher than that of the main battery. In the event of the backup motor operation required by a malfunction in a steer-by-wire system, it is possible to avoid unsuccessful activation of the backup motor due to the deterioration of the sub-battery. Therefore, it is possible to increase the reliability of the steer-by-wire system.

As to charging of the main battery and sub-battery, the apparatus applies different voltages to them so as to decelerate the deterioration of the sub-battery. In this regard, the apparatus always prioritizes charging of the sub-battery by applying higher charge voltage to the sub-battery so that the remaining capacity of the sub-battery is maintained higher than that of the main battery. Also, the apparatus continuously supplies the sub-battery with predetermined power from an onboard power generator or the main battery in order to prevent the remaining capacity of the sub-battery from falling due to self discharge and the like.

In addition, the apparatus has an emergency switch, with which switching from the main battery to the sub-battery is carried out in the event of emergency when the apparatus is not able to supply power from the main battery. In this way, it is possible to start an engine and supply power to the steer-by-wire system from the sub-battery, so that a vehicle can continue to be in operation.

Both main battery and sub-battery are charged by the onboard power generator. The apparatus applies a higher charge voltage to the sub-battery, which is produced by a booster circuit, than to the main battery. The booster circuit has a reverse current protection, which prevents current from reversely flowing into the main battery from the sub-battery even if the voltage of the main battery falls.

The aspects of the present invention will become more apparent by describing in detail illustrative, non-limiting embodiments thereof with reference to the accompanying drawings. In the embodiments hereinafter, description is given of an apparatus for supplying power for a steer-by-wire (SBW) system, which is an example of an apparatus for supplying power for a vehicle according to the present invention.

b. Construction of an Apparatus for Supplying Power for a By-Wire System

Figure 1:
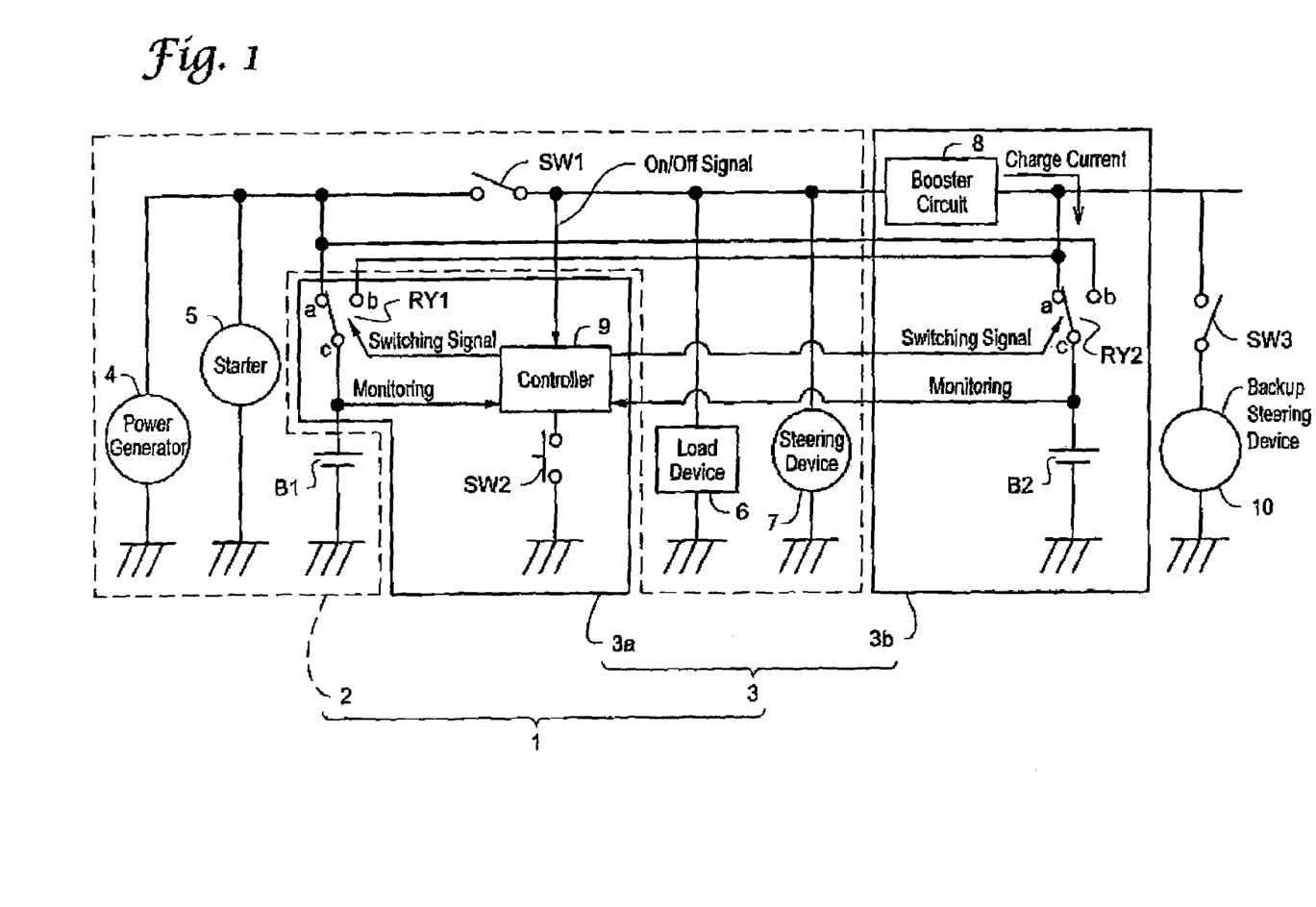
FIG. 1 is a circuit diagram showing an apparatus for supplying power for a by-wire system, which is an example of an apparatus for supplying power for a vehicle according to the present invention, with a battery B1 as a main battery and a battery B2 as a sub-battery.

As shown in FIG. 1, a battery B1 serves as a main battery and a battery B2 as a sub-battery. An apparatus 1 for supplying power for a by-wire system comprises a current power supply system 2 (shown by broken line) which is the same as a conventional power supply system onboard a vehicle and a redundant power supply system 3 (shown by solid line) for a backup.

The current power supply system 2 includes an onboard power generator 4, a starter 5 for starting an engine of a vehicle, the battery B1 serving as a main battery, a load device 6 such as electrical equipment, a steering device 7 and an ignition switch SW1. The battery B1, the load device 6 and the steering device 7 are electrically connected to the power generator 4 in parallel through the starter 5 and a relay RY1.

The redundant power supply system 3 includes a control module 3a and a power module 3b. The control module 3a includes a power controller 9, an emergency switch SW2 and the relay RY1. The power module 3b includes the battery B2 serving as a sub-battery, a relay RY2 and a booster circuit 8.

The battery B2 is electrically connected to the power generator 4 through the relay RY2, the booster circuit 8 and the ignition switch SW1.

A backup steering device 10 is electrically connected to the battery B2 through a switch SW3.

If a steer-by-wire system detects a malfunction in the steering device 7, the steer-by-wire system sends a control signal to the switch SW3 to close it, so that the backup steering device 10 starts operation receiving power from the battery B2.

The power controller 9 monitors remaining capacity and voltage for the batteries B1 and B2 and sends switching signals to the relays RY1 and RY2. The booster circuit 8 boosts up an output voltage of the power generator 4 or the main battery (battery B1), thereby supplying a large amount of charge current to the sub-battery (battery B2).

As shown in FIG. 1, if the power controller 9 sends switching signals to the relays RY1 and RY2 so as to configure connection of a-contact in both relays RY1 and RY2, a circuit is arranged so that the battery B1 is a main battery and the battery B2 is a sub-battery. The apparatus 1 supplies a normal charge current to the battery B1 from the power generator 4, imposing an output voltage of the power generator 4. In contrast, the apparatus 1 imposes a higher voltage on the battery B2 through the booster circuit 8, thereby supplying a larger amount of charge current. In this latter case, the charge current flows through the following route: the power generator 4→the ignition switch SW1→the booster circuit 8→a-contact and c-contact of the relay RY2→the battery B2.

In this exemplary case, the battery B1 corresponds to the first battery and the battery B2 to the second battery in the appended claims, respectively.

Figure 2:
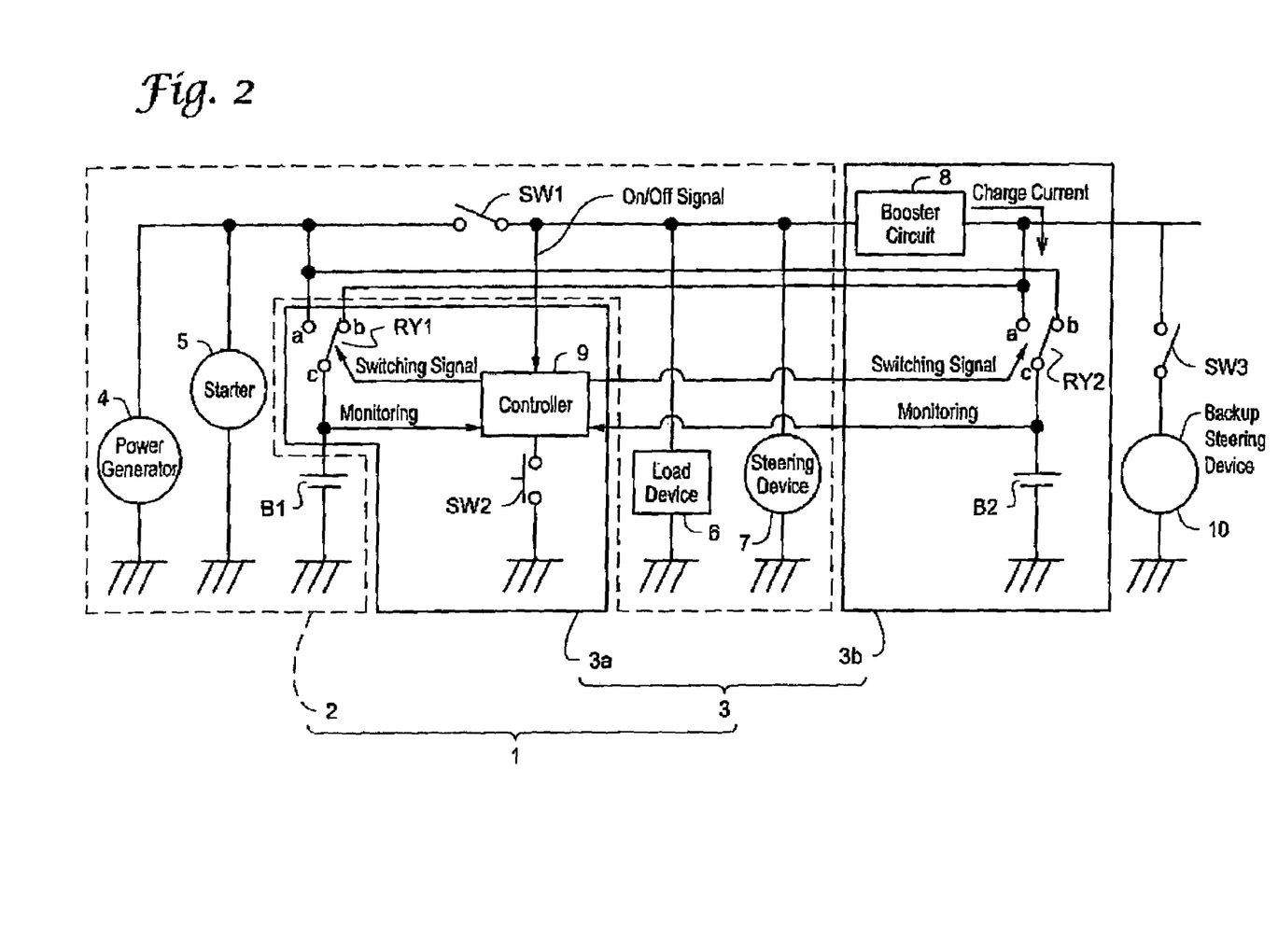
FIG. 2 is a circuit diagram similar to FIG. 1, with a battery B1 as a sub-battery and a battery B2 as a main battery.

FIG. 2 shows a circuit which is configured so that the battery B1 is a sub-battery and the battery B2 is a main battery. Because construction of the circuit shown in FIG. 2 is the same as that of FIG. 1 except for position of relay contacts, detail description is not repeated. As shown in FIG. 2, if the power controller 9 sends switching signals to the relays RY1 and RY2 to configure connection of b-contact in both relays RY1 and RY2, a circuit is arranged so that the battery B1 is a sub-battery and the battery B2 is a main battery. As a result of switching, the apparatus 1 imposes a higher voltage on the battery B1 serving as the sub-battery through the booster circuit 8, thereby supplying it a larger amount of charge current than that for the battery B2. In this connection, the charge current flows through the following route: the power generator 4→the ignition switch SW1→the booster circuit 8→b-contact and c-contact of the relay RY1→the battery B1.

c. Operation of an Apparatus for Supplying Power for a By-Wire System

Next, description is given to operation of the apparatus 1 for supplying power for a by-wire system. First description is given of a configuration in which the battery B1 is a main battery and the battery B2 is a sub-battery.

The battery B1 serving as the main battery, which is charged with power produced by the power generator 4, supplies required power to the load device 6 and the steering device 7 of a vehicle. During this period of time it may occur that the voltage of the battery B1 drops but still remains within a range where operation of the load device 6 and the steering device 7 can be continued. On the other hand, because the voltage, which results from boosting-up of the output voltage of the power generator 4 conducted by the booster circuit 8, is imposed on the battery B2, the current flowing into the battery B2 is greater than that into the battery B1. In addition, when the ignition switch SW1 is on, the power generator 4 or the battery B1 continuously supplies a predetermined power so as to charge the battery B2. In this way, it is possible to maintain stable and high remaining capacity for the battery B2 serving as a sub-battery.

Because the booster circuit 8 has a reverse current protection circuit such as a diode, a drop of voltage resulting from the deterioration of the battery B1 (main battery) will not invite an adverse current flow from the battery B2 (sub-battery) into the battery B1. Therefore, because the battery B2 assigned to a backup is free from undesirable discharge, it is always able to maintain high remaining capacity.

This reverse current protection circuit is an exemplary embodiment which provides the reverse current protection in the appended claims.

Description is given of an emergency when a vehicle comes to a stop due to the deterioration of the battery B1 (main battery). If the emergency switch SW2 is turned on, the power controller 9 sends switching signals to the relays RY1 and RY2, configuring connection of the movable c-contact to the b-contact. Because the battery B2 takes a role of the main battery in place of the battery B1 accordingly, the battery B2 is able to supply power to the starter 5 and the steering device 7.

Because the remaining capacity of the battery B2 has been maintained higher than that of the battery B1, the battery B2 is able to supply stable power to an engine system and the steering device 7 after switching. In this way, it is possible to pull the vehicle off a road in an emergency.

Next, description is given of a configuration as shown in FIG. 2 where the battery B1 serves as a sub-battery and the battery B2 as a main battery. Descriptions which are common for FIG. 1 and FIG. 2 are omitted.

The power generator 4 not only charges the battery B2 (main battery) through connection of the c-contact to b-contact of the relay RY2 but also supplies power to the load device 6 and the steering device 7. At the same time, the power generator 4 also charges the battery B1 (sub-battery) through the booster circuit 8. Because the voltage, which is boosted up by the booster circuit 8 and imposed on the battery B1, is higher than that of the battery B2, a charge current for the battery B1 is greater than that for the battery B2. Furthermore, when the ignition switch SW1 is on, a predetermined charge current continuously flows into the battery B1 from the generator 4 or the battery B2, so that the battery B1 is continuously charged. In this way, the battery B1 serving as the sub-battery is able to maintain higher remaining capacity.

If the emergency switch SW2 is turned on in an emergency, the power controller 9 sends switching signals to the relays RY1 and RY2 so as to switch the main battery and the sub-battery. This results in a configuration that the battery B1 serving as the sub-battery takes a role of the main battery in place of the battery B2.

Therefore, it is possible to start an engine and drive the steering device 7 with power supplied by the battery B1. In this way, it is possible to pull the vehicle off a road in an emergency.

In the configuration described above, the battery B2 corresponds to the first battery and the battery B1 to the second battery in the appended claims.

d. Flow for Switching Batteries in a Normal Mode

Figure 3:
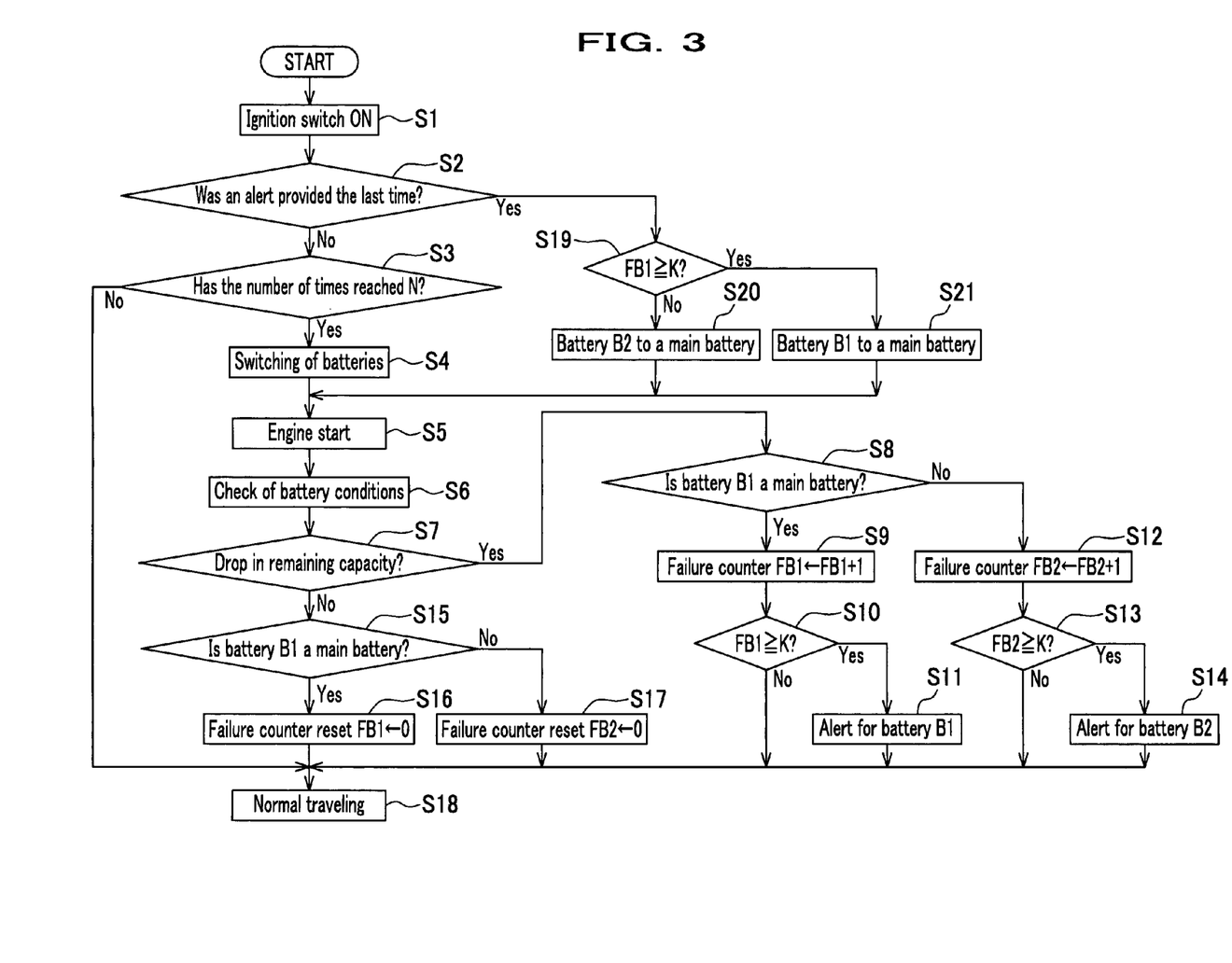
FIG. 3 is a flow chart showing steps for switching a main battery and a sub-battery in a normal mode.

Referring to a flow chart shown in FIG. 3 as well as FIG. 1 or FIG. 2, description is given of an operation for switching the main battery and the sub-battery, which is conducted by an apparatus for supplying power for a by-wire system, in a normal mode.

When the ignition switch SW1 is turned on (step S1), the power controller 9 determines if an alert for the deterioration of the main battery or the sub-battery was provided at turning on the ignition switch SW1 the last time (step S2). If no alert was provided (NO in step S2), the power controller 9 determines whether or not the accumulated number of times of turning on the ignition switch SW1 has reached a predetermined value N after the last switching of the batteries (step S3). This process is conducted for determining the necessity for checking the capacity of sub-battery.

If this number has reached N (YES in step S3), the power controller 9 sends switching signals to the relays RY1 and RY2 so as to interchange the main battery and sub-battery (step S4). The apparatus 1 activates the starter 5 so as to start the engine by supplying power from a newly assigned main battery, which has been serving as the sub-battery before the switching process in step S4 (step S5). The power controller 9 checks the voltage of the new main battery so as to check its remaining capacity (step S6).

If the remaining capacity of the main battery checked in step S6 is less than a predetermined value (YES in step S7), the power controller 9 determines if the battery B1 is assigned to the main battery (step S8). If it is (YES in step S8), the power controller 9 adds one count to a failure counter of the battery B1, namely defining FB1+1 as an updated FB1 (step S9).

The power controller 9 determines whether or not the updated count FB1 is equal to or greater than a deteriorative threshold K (FB1≧K?) (step S10). If the count FB1 is less than the deteriorative threshold K, namely FB1<K (NO in step S10), the power controller 9 allows normal traveling for the vehicle (step S18). Otherwise, namely FB1≧K (YES in step S10), the power controller 9 turns on an alert for deterioration of the battery B1 (step S11) and subsequently allows normal traveling for the vehicle (step S18).

If the battery B1 is not assigned to the main battery (NO in step S8), the power controller 9 adds one count to a failure counter of the battery B2, namely defining FB2+1 as an updated FB2 (step S12). The power controller 9 determines whether or not the updated count FB2 is equal to or greater than a deteriorative threshold K (FB2≧K?) (step S13). If the count FB2 is less than the deteriorative threshold K, namely FB2<K (NO in step S13), the power controller 9 allows normal traveling for the vehicle (step S18). Otherwise, namely FB2≧K (YES in step S13), the power controller 9 turns on an alert for deterioration of the battery B2 (step S14) and subsequently allows normal traveling for the vehicle (step S18).

On the other hand, if the remaining capacity of the main battery is not less than the predetermined value (NO in step S7), the power controller 9 determines whether or not the battery B1 is assigned to the main battery (step S15). If it is (YES in step S15), the power controller 9 resets the failure counter of the battery B1, namely setting a count FB1 as zero (step S16). In this way, the power controller 9 allows normal traveling for the vehicle (step 18).

If the battery B1 is not assigned to the main battery (NO in step S15), the power controller 9 resets the failure counter of the battery B2, namely setting a count FB2 as zero (step S17). In this way, the power controller 9 allows normal traveling for the vehicle (step S18).

The reason for selection of the procedure described above is ascribed to the following fact. If the power controller 9 consecutively observes a drop in remaining capacity at each checking process over some period of time, which results in the accumulated number of times not less than the deteriorative threshold K, the power controller 9 determines that deterioration of battery occurs. Otherwise, the power controller 9 does not, because in this case a temporary shortage of remaining capacity occurs instead, which can be restored by charging.

On the other hand, if an alert for battery deterioration is provided (YES in step S2), the power controller 9 determines whether or not a count FB1 of the battery B1 is equal to or greater than the deteriorative threshold K (FB1≧K?) (step S19) so as to identify a deteriorated battery. If FB1≧K (YES in step S19), the controller 9 assigns the battery B1 to a main battery (step S21), because the battery B1 is deteriorated.

If the count FB1 is less than the predetermined deteriorative threshold K, namely the FB1<K (NO in step S19), the controller 9 assigns the battery B2 to a main battery (step 20), because the battery B2 is deteriorated.

In this way, the power controller 9 performs engine starting with a newly assigned main battery (step S5), in the same process which is applied to the battery having undergone switching in step S4. Subsequently, the power controller 9 activates the starter 5 so as to start the engine and checks the remaining capacity of the main battery, allowing normal traveling for the vehicle.

If the number of times of turning on the ignition switch SW1 has not reached N (NO in step S3), the power controller 9 allows normal traveling for the vehicle (step S18).

e. Flow for Switching Batteries in an Emergency Mode

Figure 4:
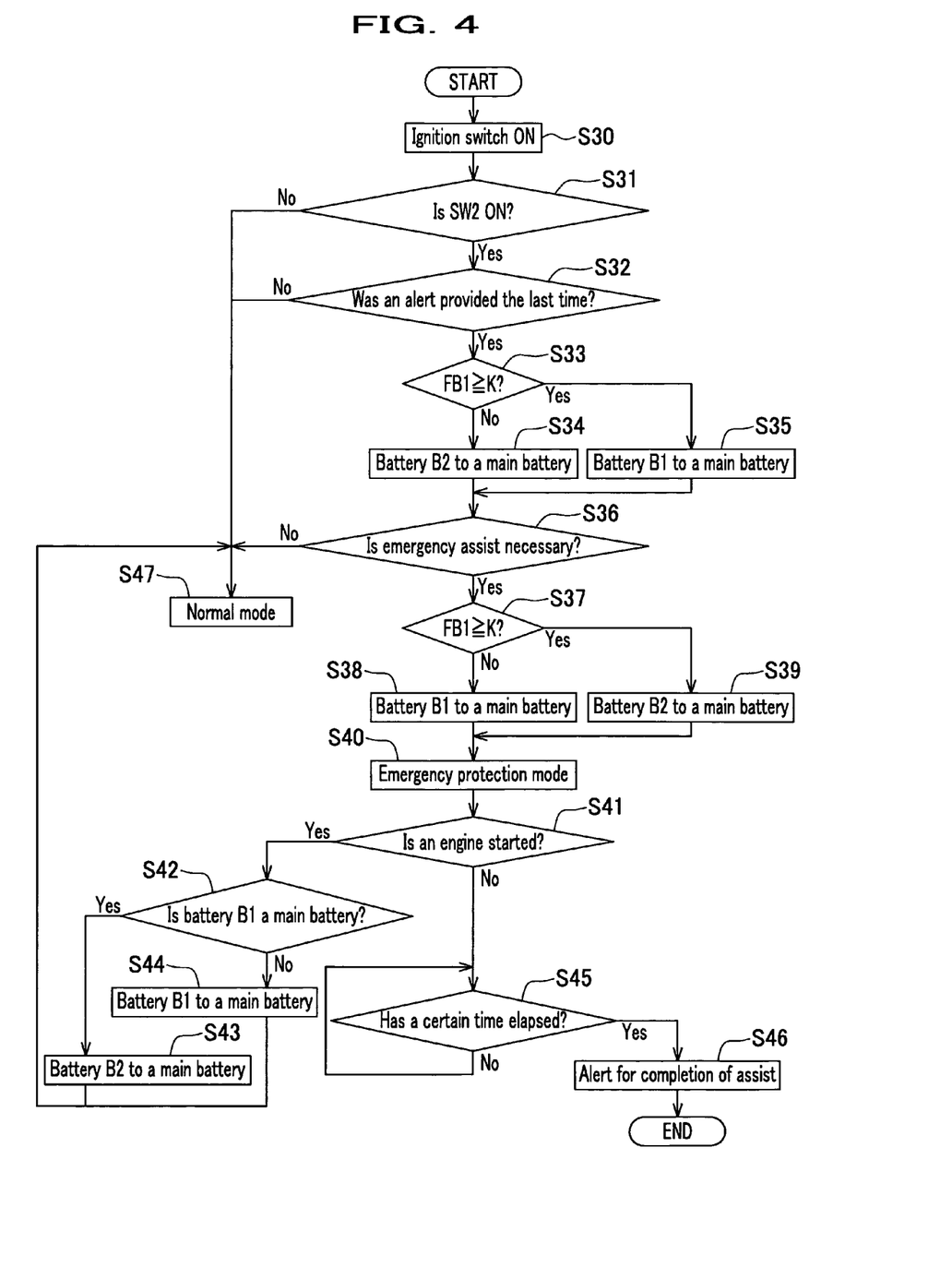
FIG. 4 is a flow chart showing steps which are carried out in providing emergency assist.

Description is given of emergency assist for a vehicle with reference to FIG. 4 as well as FIG. 1 or FIG. 2. FIG. 4 is a flow chart showing steps which are carried out in providing emergency assist by an apparatus for supplying power for a by-wire power system according to the present invention.

When the ignition switch SW1 is turned on (step S30), the power controller 9 checks whether or not the emergency switch SW2 has been turned on (step S31). If not, the process proceeds to a normal mode (step S47).

In operation in the normal mode as shown in the flow chart in FIG. 3 described above, checking the conditions of batteries, the power controller 9 assigns a battery having higher remaining capacity to a sub-battery and allows normal traveling for the vehicle.

On the other hand, if the power controller 9 detects that the emergency switch SW2 has been turned on, it determines that a driver of the vehicle requests emergency assist, who suffers from a trouble of the vehicle unable to travel due to deterioration of a main battery. Accordingly, the power controller 9 determines whether or not an alert for the deterioration of main battery or sub-battery was provided while the ignition switch SW1 was off the last time (step S32). If not (NO in step 32), the power controller 9 determines that the main battery is in sound conditions and the process proceeds to the normal mode (step S47).

In contrast, if it was (YES in step S32), the power controller 9 determines whether or not a count FB1 of the battery B1 is equal to or greater than the deteriorative threshold K (FB1≧K?) (step S33). If FB1≧K (YES in step S33), the power controller 9 assigns the battery B1 to a main battery (step S35), because the battery B1 is deteriorated. If FB1<K (NO in step S33), the power controller 9 assigns the battery B2 to a main battery (step S34), because the battery B2 is deteriorated. In this way, a deteriorated battery is assigned to a main battery in the same fashion as that of the normal mode.

Next in step S36, the power controller 9 checks the conditions of vehicle so as to determine whether or not emergency assist is required for the vehicle. This emergency assist is necessary in such a possible emergency case where the vehicle is brought to a standstill on a road due to deterioration of the battery. Specifically, the controller 9 determines whether or not it makes the process proceed to an emergency mode, in which power is temporarily provided to the starter 5, the steering device 7 and the like so that a driver can pull the vehicle off the road.

Checking of the conditions of vehicle conducted by the power controller 9 includes: (1) if an engine has stopped; (2) if the vehicle is unable to normally travel for lack of steering with its hood being opened; (3) if the speed of vehicle is very low. If it is not necessary to provide emergency assist (NO in step S36), the process proceeds to the normal mode (step S47).

If it is necessary (YES in step S36), the power controller 9 determines whether or not a count FB1 for the failure counter of the battery B1 is equal to or greater than the deteriorative threshold K (FB1≧K?) (step S37). This process is carried out in order to determine which one of the batteries B1 and B2 should be assigned to a main battery.

If FB1≧K (YES in step S37), the power controller 9 assigns the deteriorated battery B1 to a sub-battery and the other sound battery B2 to a main battery (step S39). In this way, the apparatus 1 for supplying power for a by-wire system is ready to supply power to the starter 5, the steering device 7 and the like with the battery B2, so that it is possible to start the engine of vehicle and activate its steering.

If the FB1<K (NO in step S37), the power controller 9 assigns the deteriorated battery B2 as a sub-battery and the other sound battery B1 as a main battery (step S38). In this way, the apparatus 1 is ready to supply power with the battery B1 so that it is possible to start the engine of vehicle and activate its steering in the similar fashion as the case of the battery B2 described above. The process thus proceeds to an emergency protection mode (step S40).

Because in the emergency protection mode it is possible to start the engine and conduct steering, it is possible to carry out an emergency task such as pulling the vehicle off a road. The power controller 9 checks whether or not the engine is started (step S41).

If the power controller 9 confirms that the engine is started (YES in step S41), the power controller 9 conducts switching of the batteries so that a sound battery is assigned to a sub-battery, because the power generator 4 is now able to supply power to the vehicle.

The power controller 9 checks whether or not the battery B1 is a main battery (step S42).

If the battery B1 is the main battery (YES in step S42), the power controller 9 conducts switching of the batteries so that the battery B1 is assigned to a sub-battery and the battery B2 to the main battery (step S43).

If the battery B1 is not the main battery (NO in step S42), namely the battery B2 is the main battery, the power controller 9 conducts switching of the batteries so that the battery B1 is assigned to the main battery and the battery B2 to a sub-battery (step S44). Subsequent to steps 43 and 44, the process proceeds to the normal mode (step S47).

As describe above, after the engine is started, it is possible to keep the sub-battery in sound conditions by assigning the sound battery as the sub-battery and the deteriorated battery as the main battery.

On the other hand, if the power controller 9 confirms that the engine has not started in step S41, it is necessary to remove the vehicle by human power. In order to determine the completion of removal of the vehicle, the power controller 9 checks whether or not a predetermined time has elapsed after steering force fell to plus or minus zero Nm (step S45). If the power controller 9 detects that steering force exists or determines that the predetermined time has not yet elapsed despite zero of steering force (NO in step S45), the power controller 9 continues the same checking because the vehicle is still being removed by human power.

In case of YES in step S45, which means that the removal of vehicle is completed, the power controller 9 finishes the emergency assist and conducts switching of the batteries so that a sound battery is restored to serve as a sub-battery. In addition, the power controller 9 provides an alert notifying the completion of assist, thereby completing the process (step S46).

As described above, when the engine is not started, the power controller 9 conducts switching of the batteries after completion of removal of the vehicle so that a sound battery is restored to serve as a sub-battery and a deteriorated battery as a main battery. In this way, because the apparatus 1 for supplying power for a by-wire system does not allow unnecessary supply of power, it is possible to maintain the power of sub-battery in desirable conditions.

After switching of the batteries, the power controller 9 automatically assigns a battery in sound conditions to a sub-battery according to results of regular checking for the deterioration of batteries.

In the embodiment described above, introducing the deteriorative threshold K, the power controller 9 detects the deterioration of the batteries. It also determines that a deteriorated battery has smaller remaining capacity, assigning the deteriorated battery to a main battery. On the other hand, the power controller 9 determines that a sound battery has greater remaining capacity, assigning the sound battery to a sub-battery. It may be alternatively possible to directly detect remaining capacity of batteries and assign a main battery and a sub battery according to this type of detection.

While the invention has been described in detail and with reference to specific embodiments thereof, it will be apparent to one skilled in the art that various changes and modifications can be made therein without departing from the spirit and scope thereof. For example the apparatus can be applied to a brake-by-wire system, which requires high reliability for a power supply. In this case, a main battery normally supplies power to the brake-by-wire system. When the main battery does not have sufficient remaining capacity due to deterioration, a sound sub-battery supplies power instead of the main battery, so that it is possible to implement a reliable brake-by-wire system.

The present invention is not limited to the embodiment described above, in which the main battery supplies power to the load device 6 but the sub-battery to the backup steering device 10.

For example, a method for switching the main battery and sub-battery is applicable to supply of power for a power steering system. In this case, when a motor for the power steering system can not work due to deterioration of the main battery, a sub-battery in sound conditions is used as a backup for supplying power to the motor. In this way, it is possible to restore the power steering system in emergency.

The present invention is not limited to the embodiment described above, in which the booster circuit 8 boosts up the output voltage of power generator 4 or the voltage of main battery so that the voltage imposed on the sub-battery is higher than that of the main battery. For example, it may be alternatively possible to add a function of checking the charge condition of sub-battery to the booster circuit 8. When the sub-battery is in full charge, the function allows that the booster circuit 8 conducts minimum charging for the sub-battery sufficient for maintaining its remaining capacity while imposing a voltage, which is lower than that of normal charging.

The present invention is not limited to the embodiment described above, in which when emergency assist is required due to deterioration of the main battery, the power controller 9 switches the main battery and sub-battery by operating the relays RY1 and RY2 so that power is supplied to the steering device 7 and the like in order to remove the vehicle. For example, it may be alternatively possible to close the switch SW3 so that the sub-battery supplies power to the backup steering device 10 instead of switching of the batteries The load device 6, the steering device 7, the power controller 9 and the starter 5 correspond to the load devices in the appended claims.

Steps 19-21 in FIG. 3 describe the operation for the control device in the appended claims.

Steps 4-7 in FIG. 3 describe the operation for the monitoring device in the appended claims.

Foreign priority document, JP 2003-381221 filed on Nov. 11, 2003 is hereby incorporated by reference.

What is claimed is:

1. An apparatus for supplying power for a vehicle, comprising:
   a first battery electrically connected to load devices which are mounted on the vehicle;
   a second battery, wherein when the second battery is a backup power source,
      the second battery is electrically isolated from the load devices, and
      the second battery is electrically connected to a power generator for charging the second battery;
   said first and second batteries being interchangeable;
   wherein the first battery, the second battery, and the load devices form a parallel circuit;
   switching means for switching the first and second batteries so that when the first and second batteries are switched,
      said first battery serves as the backup power source and is electrically isolated from the load devices,
      the first battery is electrically connected to the second battery,
      the first battery is electrically connected to the power generator mounted on the vehicle for charging the first battery, and
      said second battery is electrically connected to the load devices;
   a monitoring device for monitoring remaining capacity for each of the first and second batteries;
   a control device, wherein when the control device determines that the remaining capacity of the second battery is less than the remaining capacity of the first battery based on information monitored by the monitoring device, the control device controls the switching means so as to conduct switching of the first and second batteries; and
   a charge controller that controls charging of the first and second batteries,
   wherein a charge voltage applied to the second battery is greater than a charge voltage applied to the first battery.

2. An apparatus according to claim 1, wherein when the vehicle is in operation, the charge controller controls such that one of the power generator and the first battery continuously supplies a predetermined amount of power to the second battery.

3. An apparatus according to claim 1, wherein the charge controller has charge protection against charging of the first battery conducted by the second battery.

4. An apparatus for supplying power for a vehicle, comprising:
   a first battery;
   a second battery;
   a load device;
   a power generator;
   wherein the first battery, the second battery, and the load devices form a parallel circuit;
   switching means for switching between a first state and a second state,
   wherein in the first state, the power generator is electrically connected to the first battery and the second battery, and the first battery serves as a main battery and the second battery serves as a sub-battery,
   wherein in the second state, the power generator is electrically connected to the first battery and the second battery, and the first battery serves as the sub-battery and the second battery serves as the main battery, and
   wherein both in the first state and in the second state, the sub-battery is electrically isolated from the load device;
   a monitoring device for monitoring a main remaining capacity of the main battery and a backup remaining capacity of the sub-battery;
   a control device that is in communication with the monitoring device,
   wherein the control device makes a comparison, wherein the main remaining capacity is compared to the backup remaining capacity,
   wherein the control device controls the switching means to switch between the first state to the second state based on the comparison,
   a charge controller that controls charging of the main battery and the sub-battery; and
   a booster circuit that increases a charge voltage applied to the sub-battery,
   wherein the charge voltage applied to the sub-battery is higher than a charge voltage applied to the main battery, and
   wherein the booster circuit includes a reverse current protection that prevents current flow to the main battery from the sub-battery.

5. An apparatus according to claim 4, further comprising an emergency switching device which executes switching from the first battery to the second battery when the remaining capacity of the second battery is greater than the remaining capacity of the first battery.

6. An apparatus according to claim 4, wherein the load device comprise a by-wire system for controlling electromechanical components of the vehicle by electric signals.

7. An apparatus according to claim 6, wherein the by-wire system comprises a steer-by-wire system.

8. An apparatus according to claim 6, wherein the by-wire system comprises a brake-by-wire system.

9. The apparatus for supplying power for a vehicle according to claim 4,
   wherein the sub-battery is charged by receiving a predetermined power, and
   wherein the predetermined power is from the power generator or from the main battery.

* * * * *